US012363526B2

(12) United States Patent
Phan et al.

(10) Patent No.: US 12,363,526 B2
(45) Date of Patent: Jul. 15, 2025

(54) METHOD FOR SENDING A MESSAGE FROM A REMOTE SERVER TO A TERMINAL

(71) Applicant: THALES DIS FRANCE SAS, Meudon (FR)

(72) Inventors: Ly Thanh Phan, Le Plessis Robinson (FR); Jean-François Gros, Marseilles (FR); Vincent Dany, Aubagne (FR)

(73) Assignee: THALES DIS FRANCE SAS, Meudon (FR)

( * ) Notice: Subject to any disclaimer, the term of this patent is extended or adjusted under 35 U.S.C. 154(b) by 371 days.

(21) Appl. No.: 18/026,646

(22) PCT Filed: Aug. 31, 2021

(86) PCT No.: PCT/EP2021/073966
§ 371 (c)(1),
(2) Date: Mar. 16, 2023

(87) PCT Pub. No.: WO2022/058156
PCT Pub. Date: Mar. 24, 2022

(65) Prior Publication Data
US 2023/0345234 A1     Oct. 26, 2023

(30) Foreign Application Priority Data

Sep. 17, 2020  (EP) .................................... 20315412

(51) Int. Cl.
*H04W 12/04*     (2021.01)
*H04W 12/033*    (2021.01)
(Continued)

(52) U.S. Cl.
CPC ......... *H04W 12/033* (2021.01); *H04W 12/04* (2013.01); *H04W 12/106* (2021.01); *H04W 12/69* (2021.01)

(58) Field of Classification Search
CPC .................................................... H04W 12/03
See application file for complete search history.

(56) References Cited

U.S. PATENT DOCUMENTS 10,700,856 B2    6/2020  Nix
12,034,875 B2 *  7/2024  Aschauer ................ H04L 63/08
(Continued)

FOREIGN PATENT DOCUMENTS

EP        3664486 A1    6/2020

OTHER PUBLICATIONS

International Search Report and Written Opinion mailed on Sep. 29, 2021 for corresponding International Application PCT/US2021/073966 (11 pages).

*Primary Examiner* — Michael T Vu

(57) ABSTRACT

The present disclosure relates to a method for sending a message from a remote server to a terminal, the remote server and the terminal sharing a secret key, the method comprising:
i—Sending from the terminal to the remote server a first identity;
ii—Retrieving at the remote server the first identity and retrieving the secret key based on the first identity;
iii—At the remote server, choosing a random number and generating a second identity thanks to the first identity, the random number and the secret key;
iv—At the remote server, generating a signature from the first identity, the message, a counter value, the random number and the secret key;
v—At the remote server, generating a first response for the terminal, the first response being a concatenation of the message, a counter value, the signature and the random number, and ciphering the first response with the secret key and sending the first ciphered response to the terminal;

(Continued)

vi—At the terminal, deciphering the first ciphered response with the secret key to obtain the first response, retrieving the message, the counter value, the signature and the random number, deriving the expected signature of the first response, verifying that the signature is equal to the expected signature and verifying that the counter value is correct, and if it is correct, derive the second identity from the first identity, the secret key and the random number.

12 Claims, 3 Drawing Sheets

(51) Int. Cl.
    *H04W 12/106*     (2021.01)
    *H04W 12/69*     (2021.01)

(56) References Cited

U.S. PATENT DOCUMENTS

2018/0191695 A1* 7/2018 Lindemann ......... H04L 63/0853
2019/0313246 A1* 10/2019 Nix ..................... H04W 12/069

* cited by examiner

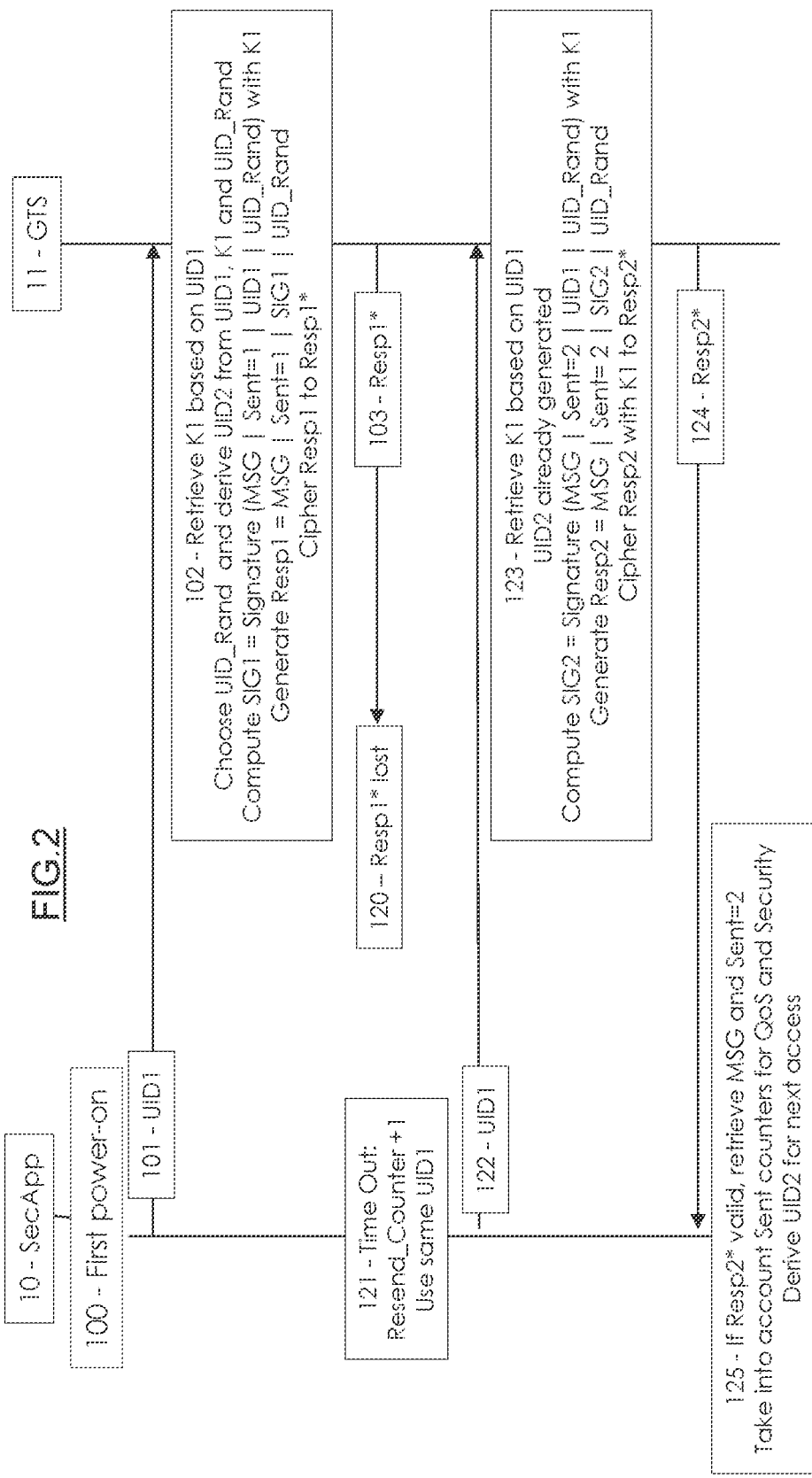

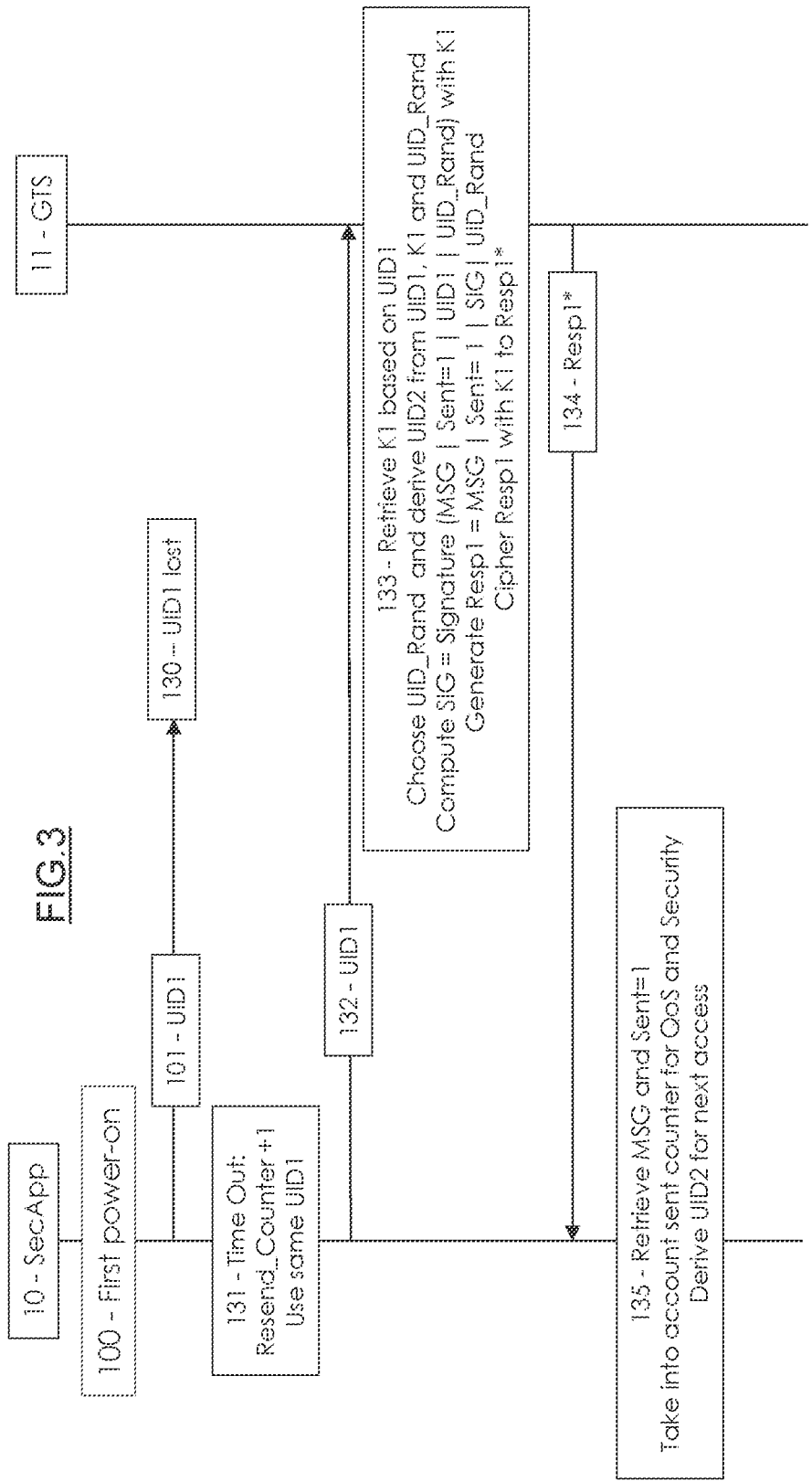

METHOD FOR SENDING A MESSAGE FROM A REMOTE SERVER TO A TERMINAL

FIELD OF USE

The present invention concerns telecommunications in 3G, 4G or 5G networks. It refers more precisely to a method for sending a message from a remote server to a terminal, the remote server and the terminal sharing a secret key.

The invention can be applied to IoT products and associated services.

BACKGROUND

It is known that a terminal in a cellular telecommunication network comprises a security element like a Sim card or a UICC (Universal Integrated Circuit Card) or an embedded UICC (eUICC). This security element has to poll regularly an OTA (Over The Air) server in order to know if this OTA server has some data to transfer to the security element. This is done by a card applet installed in the security element.

Existing polling mechanism by a card applet to an OTA server or an IoT applet and a remote server to check whether there is an update is a frequently used method when devices are deployed in SMS-less networks (e.g. IoT deployments).

Such methods have many drawbacks and associated problems. The major problems are the scalability of the method and the security (PKI) related issues:

The scalability issues include:
  Polling Server may be overwhelmed by the number of remote devices performing the polling and by the number/frequency of polling events
  The overhead of the polling mechanism impacts the performance on both sides of the polling system: On the device side overhead can consume to much battery power and on the server side, overhead consume computation power and communication bandwidth.
Security issues include:
  PKI based mechanism may be used but would consume too much power on the device side for polling mechanism that results most of the time in no-operation
  Identity privacy of the device has to be protected and traceability of the device is to be prevented in non-public key protocol
  Exchanges need be confidentiality and integrity protected

SUMMARY

The present invention proposes a solution to these problems.

More precisely, the present invention proposes a method for sending a message from a remote server to a terminal, the remote server and the terminal sharing a secret key, the method comprising:
  i—Sending from the terminal to the remote server a first identity;
  ii—Retrieving at the remote server the first identity and retrieving the secret key based on the first identity;
  iii—At the remote server, choosing a random number and generating a second identity thanks to the first identity, the random number and the secret key;
  iv—At the remote server, generating a signature from the identity first, the message, a counter value, the random number and the secret key;
  v—At the remote server, generating a first response for the terminal, the first response being a concatenation of the message, a counter value, the signature and the random number, and ciphering the first response with the secret key and sending the first ciphered response to the terminal;
  vi—At the terminal, deciphering the first ciphered response with the secret key to obtain the first response, retrieving the message, the counter value, the signature and the random number, deriving the expected signature of the first response, verifying that the signature is equal to the expected signature and verifying that the counter value is correct, and if it is correct, derive the second identity from the first identity, the secret key and the random number.

Preferably, if at step-ii—the remote server cannot retrieve the secret key based on the first identity, the remote server considers that a DoS attack has occurred.

Advantageously, if the first ciphered response (Resp1*) sent to the terminal is not received by the terminal in a given time frame after having executed step-i—, the terminal increases by one the value of a counter (Resend_Counter) and executes again step-i—.

Preferably, if the message sent at step-v—is not received by the terminal and the terminal does not send a second unique identifier to the remote server, the remote server increases by one the value of the counter value, and repeats step-vi—.

Advantageously, if the message sent at step-i—is not receiving an answer from the remote server in a given time frame, the terminal increases the counter value by one and repeats step-i—with the new counter value.

Preferably, the unique identifier is sent regularly by the terminal to the remote server, on the basis of a rule sent by sent remote server to the terminal.

The remote server is preferably integrated in an OTA server.

Advantageously, the transport protocol between the terminal and the remote server is UDP.

In one embodiment, the returned message is to inform the terminal to slow down the frequency of the requests.

In another embodiment, the returned message at step-v— is to inform the terminal to increase the frequency of the requests.

Alternatively, the returned message at step-v—is to request an on board key generation.

In another alternative, the returned message at step-v—is to inform the terminal to open an HTTP communication with an OTA server.

BRIEF DESCRIPTION OF THE DRAWINGS

The present invention will be better understood by the following description of the three figures that represent:

FIG. 2 demonstrates what happens when answering to the SecApp 10 from the GTS 11, a message is lost;

FIG. 3 demonstrates what happens when UID1 is not received by the GTS 11.

DETAILED DESCRIPTION

Figure 1:
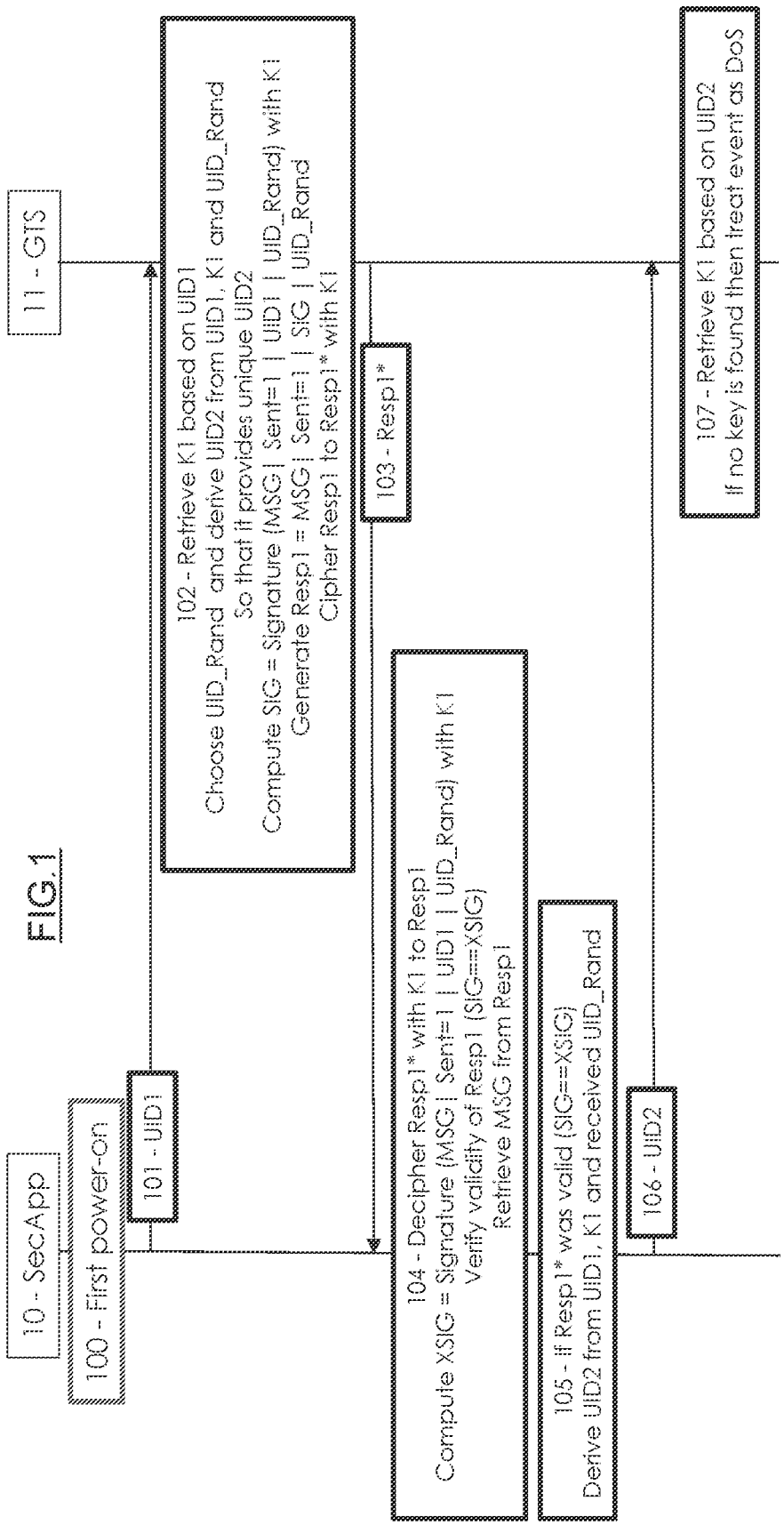
FIG. 1 demonstrates the general concept of the invention in an optimal case (no loss of communication between the terminal and a remote server)

FIG. 1 describes the general concept of the invention (optimal case).

Two entities are represented: A Security Application (SecApp 10) installed at the level of a terminal or more precisely preferably at the level of a secure element comprised in this terminal, and at least a Global Triggering Server (GTS 11) that can also be considered as a paging server.

The GTS 11 can be a standalone server or integrated in an OTA platform.

The SecApp 10 is installed in a terminal, (for example in an IoT device) or in a secure element (UICC, eUICC) cooperating with this terminal and is able to (at a first power-on step 100 or regularly or at the occurrence of an event), send a unique identifier (UID1) at step 101 to the GTS 11. This UID1 is for example the ICCID of the secure element in which the SecAPP is installed, or a unique identifier of the SecApp 10 for this device. SecApp 10 contains a secret key K1. K1 can also be the key used by the secure element to encipher the data sent to the GTS 11 or to the OTA server.

The transport protocol between the terminal 10 and the remote server 11 is preferably UDP. When receiving the UID1, the GTS 11 (acting as an OTA server or being integrated in it) retrieves, at a step 102, the key K1 associated to this UID1 (K1 also being generally called Ki in 3G and 4G telecommunication networks). GTS 11 then choses or generates a random number, called UID_Rand and derives a unique identifier UID2 from UID1, UID_RAND and K1.

In the figures, I corresponds to a concatenation of data.

UID_RAND is generated and chosen to permit to generate a unique UID2 in the system of the operator.

GTS 11 then generates a signature SIG of the concatenation of a message MSG to be sent to the terminal 10, a number (Sent=1) representing the occurrence of the sent message (normally #1 if it is the first answer from the GTS 11 to the SecApp 10), the UID1 that has been received and the UID_Rand. This signature SIG is signed by the key K1.

As an attacker may know the clear and encrypted text, it is not secure to send the UID1 encrypted in the response. So, instead of sending UID1 in Resp1 that will be later sent encrypted, a signature (SIG) of the response based on the secret key (K1), UID1, the message MSG, the counter and the random number is sent.

Then, the GTS 11 ciphers this Resp1 with the key K1 (to generate Resp1*) and sends it back to SecApp 10 (step 103).

The SecApp 10 then (at step 104) deciphers the response (Resp1*) with the secret key K1 to obtain the first response (Resp1). It can then compute XSIG that is the signature of MSG I sent=1|UID1|UID_Rand with its locally stored secret key K1.

It can then verify that SIG equals to XSIG. If they are equal, the SecApp 10 retrieves the message MSG from Resp1.

This message MSG can be a request to connect to the OTA server (now, or at a given time), a request to not do anything, or any other information to be sent to the SecApp 10. It can also be "No Update", "There is an update available on OTA", "Polling More Frequently", "Poll Less Frequently", "Generate new Key", etc . . . , message and command, on communication level and Application level; It contains also a transport identity update information.

The unique identifier can be sent regularly by the terminal to the remote server, on the basis of a rule sent by the remote server to the terminal.

At step 105, the SecApp 10 (if SIG corresponds to XSIG) can then derive UID2 from UID1, K1 and the received UID_RAND. UID2 is an identity that can be used at a later stage (step 106) when the SecApp 10 wants to connect again to the GTS 11.

In the example shown in FIG. 1, at this later stage, at step 106, the SecApp 10 sends (step 106) UID2 to the GTS 11 and at step 107, GTS 11 retrieves K1 based on UID2 and can repeat steps represented at step 102 in order to send another message to SecApp 10. In the case represented, GTS 11 does not find the key K1 based on UID2 and treats this event as being a DoS attack (Deny of Service), a random UID2 has for example been sent to GTS 11.

FIG. 2 represents what happens when answering to the SecApp 10 from the GTS 11, an answer from the GTS 11 is lost.

Steps 100 to 103 are identical to the same steps represented in FIG. 1.

But after step 103 (the GTS 11 sends the Resp1* to the SecApp 10), the RESP1* is not received by the SecApp 10 (step 120: the Resp1* is lost).

SecApp 10 contains a timer that counts the duration between the sending instant of UID1 (at step 101) and the instant when it gets the response of the GTS 11. If no response is received in a given time frame, SecApp 10 considers that the duration of answer of the GTS 11 was too long and it increases a counter (Resend_Counter) by one.

SecApp 10 then uses the same UID1 (step 122) to try to connect to GTS 11.

GTS 11 then retrieves K1 based on UID1 (UID2 has already been generated) and computes a signature SIG2 that is the signature of:

(MSG|Sent=2|UID1|UID_Rand) with K1

GTS 11 also generates a message Resp2 comprising a concatenation of:

The message MSG;
A number of the sent messages (here 2 since the first message sent at step 102 was not received by the SecApp 10);
SIG2;
UID_Rand.

GTS 11 then ciphers this Resp2 with the key K1 (to generate Resp2*) and sends it back to SecApp 10 (step 124).

The SecApp 10 then (step 125) deciphers Resp2* with his key K1 to obtain Resp2. It performs then a check of validity of Resp2 (verifies UID1 and Sent=2). Sent=2 permits to estimate the QoS (Quality of Service) and security purposes (DoS attack).

SecApp 10 then derives UID2 for the next access to GTS 11 (as explained in step 105 of FIG. 1).

So, for this figure, if the first ciphered response (Resp1*) sent to the terminal 10 is not received by the terminal 10 in a given time frame after having executed step 101, the terminal increases by one the value of a counter (Resend_Counter) and executes again step 101 (at step 122).

FIG. 3 represents what happens when UID1 is not received by the GTS 11.

Steps 100 and 101 are identical to steps represented in FIGS. 1 and 2.

But after step 101 (the SecApp 10 has sent UID1 to the GTS 11, the message is lost (step 130—UID1 lost) and is not received by the GTS 11.

The SecApp 10 then increases, after a given time, the value of its counter (step 131) and resends (step 132) UID1 to the GTS 11.

Step 133 is identical to steps 102 of FIGS. 1 and 2.

At step 134, Resp1* is sent to the SecApp 10 that retrieves (step 135) the message and Sent=1. This counter (Sent=1)

permits to evaluate the QoS and increases the security of the system. SecApp 10 can then derive UID2 for accessing the GTS 11.

So, in this figure, if the message sent at step 101 is not receiving an answer from the remote server 11 in a given time frame, the terminal 10 increases the counter value (Resend_Counter) by one and repeats step 101 (at step 132).

Optionally, the system security is improved when the encryption key K1 is modified for each new request. In such embodiment:

The GTS 11:
- after receiving a valid UID1 request, generates a unique UID2 based on K1, UID1 and UID_Rand
- derives a new key K2 from K1 associated to UID1 and Rand_UID, and
- Associates K2 to UID2
- Only use the new K2 when it receives a request with UID2 identifier.

The SecApp 10:
- After receiving a valid response and successful extract UID_Rand from the deciphered response from GTS, generates a unique UID2 based on K1, UID1 and UID_Rand
- derives K2 from K1 associated to UID1 and extracted Rand_UID,
- Uses K2 for deciphering the response from GTS for UID2 request.

The main advantages of the invention are:
- It is scalable as it minimizes the communication overhead compared to a session based protocol (http) and uses symmetric key based encryption compared to HTTPS that uses asymmetric keys
- It minimize the power consumption on the device by:
  - Using symmetric key encryption
    - Very small packet over a session-less and stateless protocol (e.g. UDP)
    - When Local Triggering system is used, this can further increase scalability and improve power consumption on the device side as it shorter the round trip time. In such case, the Global Triggering system delegate the handling of the terminal requests to a Local Triggering system located close to the terminals to be handled e.g. in an Edge Computing architecture deployment.
- It provides device identity protection and confidentiality of the communication.

The invention claimed is:

1. A method for sending a message from a remote server to a terminal, said remote server and said terminal sharing a secret key, said method comprising:
   - i—Sending from said terminal to said remote server a first identity;
   - ii—Retrieving at said remote server said first identity and retrieving said secret key based on said first identity;
   - iii—At said remote server, choosing a random number and generating a second identity thanks to said first identity, said random number and said secret key;
   - iv—At said remote server, generating a signature from said first identity, said message, a counter value, said random number and said secret key;
   - v—At said remote server, generating a first response for said terminal, said first response being a concatenation of said message, a counter value, said signature and said random number, and ciphering said first response with said secret key and sending said first ciphered response to said terminal;
   - vi—At said terminal, deciphering said first ciphered response with said secret key to obtain said first response, retrieving said message, said counter value, said signature and said random number, deriving the expected signature of said first response, verifying that said signature is equal to said expected signature and verifying that said counter value is correct, and if it is correct, derive said second identity from said first identity, said secret key and said random number.

2. The method according to claim 1, wherein if at step-ii-said remote server cannot retrieve said secret key based on said first identity, said remote server considers that a DOS attack has occurred.

3. The method according to claim 1, wherein if said first ciphered response sent to said terminal is not received by said terminal in a given time frame after having executed step-i-, said terminal increases by one the value of a counter and executes again step-i-.

4. The method according to claim 3, wherein if the message sent at step-v- is not received by said terminal and said terminal does not send a second unique identifier to said remote server, said remote server increases by one the value of said counter value, and repeats step-vi-.

5. The method according to claim 3, wherein if the message sent at step-i- is not receiving an answer from said remote server in a given time frame, said terminal increases said counter value by one and repeats step-i- with said new counter value.

6. The method according to any of the claim 1, wherein said unique identifier is sent regularly by said terminal to said remote server, on the basis of a rule sent by sent remote server to said terminal.

7. The method according to any of the claim 1, wherein said remote server is integrated in an OTA server.

8. The method according to claim 1, wherein the transport protocol between said terminal and said remote server is UDP.

9. The method according to claim 1, wherein the returned message is to inform said terminal to slow down the frequency of the requests.

10. The method according to claim 1, wherein the returned message at step -v- is to inform said terminal to increase the frequency of the requests.

11. The method according to claim 1, wherein the returned message at step-v- is to request an on board key generation.

12. The method according to claim 1, wherein the returned message at step-v- is to inform said terminal to open an HTTP communication with an OTA server.

* * * * *